June 4, 1940.                H. A. TAYLOR                2,203,397
PLATE ATTACHING DEVICE
Filed Oct. 7, 1938

Inventor.
Henry A. Taylor

Patented June 4, 1940

2,203,397

UNITED STATES PATENT OFFICE 2,203,397

PLATE ATTACHING DEVICE

Henry A. Taylor, Dorchester, Mass.

Application October 7, 1938, Serial No. 233,723

9 Claims. (Cl. 85—36)

This invention relates to fastening devices and particularly to a fastening device primarily intended to secure an automobile registration number plate to its bracket.

Automobile number plates are commonly secured to the bracket by bolts or screws and nuts which are exposed to the weather and become rusted or otherwise stuck together so that their removal at the end of the year is oftimes quite difficult and usually requires the use of two wrenches or a wrench and a screw driver. With some types of cars it is quite difficult to find sufficient room at the back of the number plate to operate the necessary tools.

Different forms of number plate attaching devices have been proposed with the idea of simplifying the work of changing the plates but most of these devices have coil springs which can break or corrode or are open to other objections.

An object of the present invention is the provision of a number plate attaching device free from parts which are liable to adhere together strongly by rust or dirt and so arranged that the parts are strong and simple and so arranged that the device can be set up or exert a clamping action by a blow applied to one of its parts by any suitable implement and can be released by another blow; and also such that the device can be used and operated in cramped quarters or in the narrow space that is now found frequently between the rear part of the number plate and its bracket and the automobile body.

A further object of the invention is the provision of an attaching device comprising a stud adapted to pass through the opening in the number plate and in the bracket and an improved form of clamping plate of bow spring shape having a longitudinal slot therein adapted to operate in an annular groove in the shank of the stud and adapted to be flattened by driving the plate crosswise of the stud to exert a clamping effect on the plate and bracket.

A bow spring plate has been proposed heretofore as a clamping member but has been found by experience not to be satisfactory in securing the number plate of an automobile securely to the bracket when subject to the jars and shocks that the automobile receives under normal operating conditions.

Hence a further object of the invention is the provision of a clamping device including a stud and a bow spring plate wherein the plate is provided with a socket in the bowed part thereof in which the stud is adapted to be located in the clamped position of the device so that the plate cannot unintentionally move in a direction to reduce the clamping pressure when subjected to ordinary usage on an automobile.

A further object of the invention is the provision of a clamping stud and bow spring plate having upturned ends adapted to receive the blow of a hammer for setting and also for releasing the plate.

Another object of the invention is the fastening device including a stud and a bow spring plate so arranged that the plate cannot become easily unintentionally detached from the stud when it is applied thereto.

A further object is generally to improve the construction and operation of attaching devices.

Figure 1:
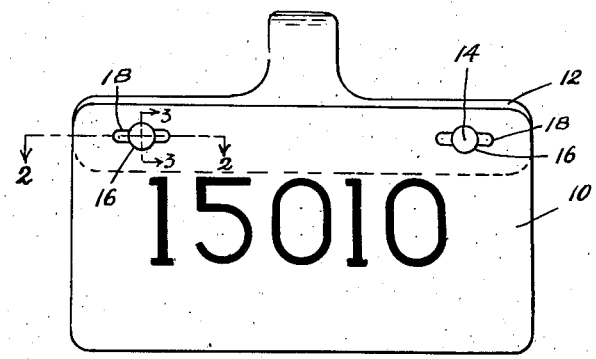
Fig. 1 is a front elevation of a number plate secured to its supporting bracket by the attaching devices of the present invention.

The invention is herein illustrated as securing the automobile registration number plate 10 detachably to the supporting bracket 12.

The fastening device embodying the present invention includes a stud 14 having an enlarged head 16 which is adapted to overlie the face of the number plate and overlap the attaching slot 18 therein and has a shank 20 which extends through the slot 18 and also the underlying slot 22 or other opening in the bracket 12. The diameter of the shank is such as to pass easily through the slots. The shank is provided near its end with an annular groove 24 which is inset from the end of the shank sufficiently to provide an annular shank flange 26. The length of the shank from the groove to the head 16 is preferably slightly greater than the combined thickness of the number plate and supporting bracket.

The groove 24 is adapted to receive a bow spring fastening plate 28. Said plate is generally rectangular in shape and preferably is substantially longer than its width and is composed of spring steel or other suitable resilient material and is relatively stiff although capable of being flexed. The plate is provided with an intermediate longitudinally bowed section 30 terminating in upturned ends 32 and 34, both of which lie on the same side of the plate and form feet or bearings 36 and 38 at the ends of the bowed section on the other side of the plate.

Figure 2:
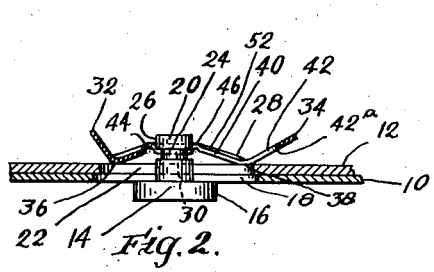
Fig. 2 is a section taken along line 2—2 of Fig. 1 and illustrating the construction of the attaching device of the present invention.
Figure 4:
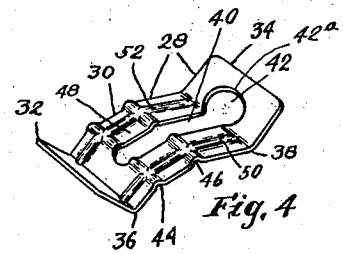
Fig. 4 is a perspective view of the bow spring clamping plate.

The plate is formed with a longitudinal slot 40 therein extending in the middle of the length of the bowed portion 30 from the upturned end 34 close to the other upturned end 32. The width of the slot is less than the diameter of the shank 20 of the stud but greater than the root diameter of the shank in the bottom of the groove 24 so that when the plate is on the stud and in the groove 24 the two are connected together and cannot be detached by separating movement of the two axially of the stud. The groove 24 of the stud is wider than the plate so that the plate can move transversely of the stud. The slot 40 is provided with an enlarged circular end 42 which lies substantially entirely in the upstanding end part 34 and is large enough in diameter to receive the shank of the stud easily but not with undue clearance when aligned therewith so that the plate can be placed over the stud and inserted in the groove 24. The upturned end part 34 is inclined at such angle that when the plate is on the stud, as illustrated in Fig. 2, the height of the top edge 42a, Fig. 2, from the bracket 12 is less than the length of the stud that projects through the bracket so that the plate cannot drop off the stud even though it is loose on the stud.

Figure 5:
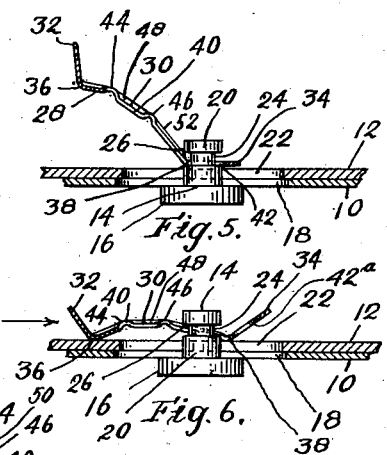
Fig. 5 is a sectional view similar to Fig. 2 but illustrating the manner of initially applying the clamping plate to the cooperating stud.
Figure 7:
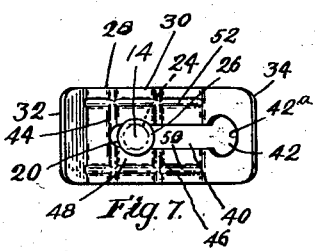
Fig. 7 is a plan view of the stud and plate in the relative positions illustrated in Fig. 2.
Figure 6:
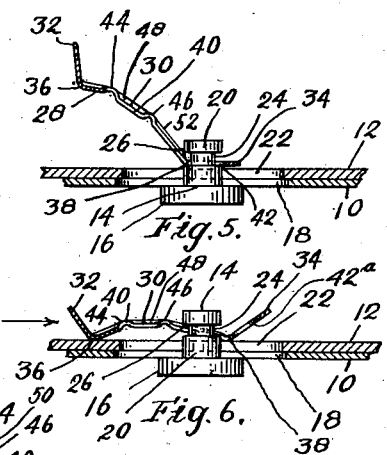
Fig. 6 is a view similar to Fig. 5 but illustrating the plate on the stud and in position to be set up or moved into a set position.
Figure 3:
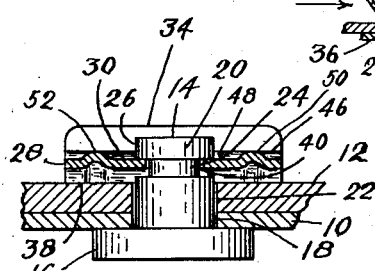
Fig. 3 is a sectional view taken along line 3—3 of Fig. 1.

The plate is applied to the stud in the manner illustrated in Fig. 5, with the inclined end part 34 approximately parallel with the face of the bracket or perpendicular to the axis of the stud.

The clamping action of the device is effected by driving the plate longitudinally of the slot 40 on the stud. The plate, being bowed lengthwise, exerts a camming action on the flange 26 of the stud and causes the head of the stud to be drawn against the number plate and at the same time causes the feet 36 and 38 of the plate to be pressed in the opposite direction against the bracket while at the same time the bowed portion of the plate is flattened.

To prevent the slipping of the plate back off the stud the plate at the top of the bowed portion thereof is formed with a pair of upstanding transverse ribs 44 and 46 that are spaced longitudinally of the plate to provide between them a socket or recess 48 located at the top of the bowed portion or slightly over the center thereof in which the flange 26 of the stud is located in the seat or clamping position of the plate. The ribs 44 and 46 project upwardly sufficiently about the flange 26 of the stud in front of the stud to prevent the plate from unintentional movement in an unclamping direction when subjected to shocks and jars. The plate, however, can be quickly moved to an unclamped position with the stud in the enlarged end part 42 of the slot 40 by a blow exerted on the upturned end 34 lengthwise of the slot.

The bowed part of the plate is also provided with longitudinally extended upstanding ribs 50 and 52 which parallel the slot 40 and provide the bowed portion with increased strength and stiffness.

I claim:

1. A plate clamping device comprising a stud having a head and a shank provided with a circumferential groove, a spring clamping plate having a longitudinally bowed intermediate part provided with a longitudinal slot adapted loosely to receive the grooved part of the stud shank and striker end parts upturned on the same side of the plate, said slot having an enlargement located mainly in one upturned end part, the enlargement being large enough to admit the passage of the stud shank thereinto only when the enlargement is positioned approximately co-axially of the stud and preventing the detachment of the plate and the stud when the end part is substantially inclined with respect to the stud axis.

2. A plate clamping device comprising a stud having a head and a shank provided with a circumferential groove, a spring clamping plate having a longitudinally bowed intermediate part provided with a longitudinal slot terminating short of the ends of the plate and adapted loosely to receive the grooved part of the stud shank and striker end parts upturned on the same side of the plate, said slot having an enlarged end portion for receiving the shank of the stud, said bowed part having means interfitting with the shank operative to hold the plate and shank in plate-flexed engagement against unintentional displacement.

3. A plate clamping device comprising a stud having a head and a shank provided with a circumferential groove, a spring clamping plate having a longitudinally bowed intermediate part provided with a longitudinal slot terminating short of the ends of the plate and adapted loosely to receive the grooved part of the stud shank and striker end parts upturned on the same side of the plate, said slot having an enlarged end portion for receiving the shank of the stud, said bowed part having means including a transverse upstanding rib disposed in the path of relative plate un-flexing movement between the plate and shank and operative to prevent unintentional movement of the plate in a release direction.

4. A plate clamping device comprising a stud having a head and a shank provided with a circumferential groove, a spring clamping plate having a longitudinally bowed intermediate part provided with a longitudinal slot terminating short of the ends of the plate and adapted loosely to receive the grooved part of the stud shank and striker end parts upturned on the same side of the plate, said slot having an enlarged end portion arranged to admit passage of the shank, said bowed part having a socket adapted to receive the shank in the set position of the device.

5. A plate clamping device comprising a stud having a head and a shank provided with a circumferential groove, a spring clamping plate having a longitudinally bowed intermediate part provided with a longitudinal slot adapted loosely to receive the grooved part of the stud shank and striker end parts upturned on the same side of the plate, said bowed part having a pair of transverse upstanding ribs spaced longitudinally of the plate forming a recess between them adapted to receive the shank and hold the plate and shank releasably locked together in the set condition of the device, said bowed part also having raised ribs paralleling and disposed on opposite sides of said slot.

6. A plate clamping device comprising a stud having a head and a shank provided with a circumferential groove, a spring clamping plate having a longitudinally bowed intermediate part provided with a longitudinal slot adapted loosely to receive the grooved part of the stud shank and striker end parts upturned on the same side of the plate, said slot having an enlargement located mainly in one upturned end part, the enlargement being large enough to admit the passage of the stud shank thereinto only when the enlargement is positioned approximately co-axially of the stud and preventing the detachment of the plate and stud when the end part is substantially inclined with respect to the stud axis, said bowed part having a socket in its mid part adapted to receive the shank in the set condition of the device.

7. A plate clamping device comprising a stud having a head and a shank provided with a circumferential groove, a spring clamping plate having a longitudinally bowed intermediate part provided with a longitudinal slot adapted loosely to receive the grooved part of the stud shank and striker end parts upturned on the same side of the plate, said slot having an enlargement located mainly in one upturned end part, the enlargement being large enough to admit the passage of the stud shank thereinto only when the enlargement is positioned approximately co-axially of the stud and preventing the detachment of the plate and the stud when the end part is substantially inclined with respect to the stud axis, said bowed part having means including a transverse upstanding rib disposed on its mid part in the path of unflexing movement of the plate and operative to prevent unintentional movement of the plate in a release direction.

8. A plate clamping device comprising a stud having a head and a shank provided with a circumferential groove, a spring clamping plate having a longitudinally bowed intermediate part provided with a longitudinal slot adapted loosely to receive the grooved part of the stud shank and striker end parts upturned on the same side of the plate, said slot having an enlargement located mainly in one upturned end part, the enlargement being large enough to admit the passage of the stud shank thereinto only when the enlargement is positioned approximately co-axially of the stud and preventing the detachment of the plate and the stud when the end part is substantially inclined with respect to the stud axis, said bowed part having in the mid part thereof a pair of transverse upstanding ribs spaced longitudinally of the plate forming a recess between them adapted to receive the shank and lock the plate together in the set condition of the device.

9. A plate clamping device comprising a stud having a head and a shank provided with a circumferential groove, a spring clamping plate having a longitudinally bowed intermediate part provided with a longitudinal slot adapted loosely to receive the grooved part of the stud shank and striker end parts upturned on the same side of the plate, said slot having an enlargement located mainly in one upturned end part, the enlargement being large enough to admit the passage of the stud shank thereinto only when the enlargement is positioned approximately co-axially of the stud and preventing the detachment of the plate and the stud when the end part is substantially inclined with respect to the stud axis, said bowed part having in the mid part thereof a pair of transverse upstanding ribs spaced longitudinally of the plate forming a recess between them adapted to receive the shank and lock the plate together in the set condition of the device, said bowed part also having raised ribs paralleling and disposed on opposite sides of the slot.

HENRY A. TAYLOR.